(12) United States Patent
Guerrab et al.

(10) Patent No.: US 8,629,875 B2
(45) Date of Patent: Jan. 14, 2014

(54) CONSTRAINT SYSTEMS AND METHODS FOR MANIPULATING NON-HIERARCHICAL OBJECTS

(75) Inventors: Rachid El Guerrab, San Diego, CA (US); Andi Terrence Smithers, San Diego, CA (US); Baback Elmieh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 12/942,591

(22) Filed: Nov. 9, 2010

(65) Prior Publication Data

US 2012/0113125 A1 May 10, 2012

(51) Int. Cl.
 *G06T 13/00* (2011.01)
(52) U.S. Cl.
 USPC ............................ 345/474; 345/473; 345/475

(58) Field of Classification Search
 USPC .................................................. 345/473–475
 See application file for complete search history.

(56) References Cited

U.S. PATENT DOCUMENTS

| | | | |
|---|---|---|---|
| 5,929,867 A * | 7/1999 | Herbstman et al. | 345/474 |
| 6,714,201 B1 * | 3/2004 | Grinstein et al. | 345/474 |
| 7,450,126 B2 * | 11/2008 | Marschner et al. | 345/473 |
| 8,125,492 B1 * | 2/2012 | Wainwright et al. | 345/551 |
| 2004/0119717 A1 * | 6/2004 | Furumoto et al. | 345/473 |
| 2005/0253847 A1 * | 11/2005 | Grassia et al. | 345/473 |
| 2007/0146371 A1 * | 6/2007 | Dariush | 345/474 |
| 2008/0049015 A1 | 2/2008 | Elmieh et al. | |
| 2009/0195544 A1 * | 8/2009 | Wrinch | 345/473 |
| 2010/0207949 A1 * | 8/2010 | Spencer | 345/473 |

* cited by examiner

*Primary Examiner* — Xiao M. Wu
*Assistant Examiner* — Todd Buttram
(74) *Attorney, Agent, or Firm* — Nicholas A. Cole (57) ABSTRACT

Methods and apparatus for animating images using bidirectional constraints are described.

36 Claims, 6 Drawing Sheets

CONSTRAINT SYSTEMS AND METHODS FOR MANIPULATING NON-HIERARCHICAL OBJECTS

BACKGROUND

Use of computer-based systems and methods has improved the production (including post production) of motion pictures, television programs and commercials, multimedia presentations, interactive games, internet content, CD-ROMs, DVDs, and simulation environments used for entertainment, training, education, marketing and visualization. Each of these applications may use multimedia data and image processing techniques to some degree to create and/or render a computer model of a scene in a real or synthetic world. The scene model not only describes buildings, parts, people, props, backgrounds, actors, and other objects in a scene, but also represents relationships between objects such as their movement, interactions, and other transformations over time.

Having a three-dimensional representation of the scene can be quite useful in most phases of multimedia production, including choreography, rendering and compositing. For example, consider a motion picture environment where computer-generated special effects are to appear in a scene with real world objects and actors. The producer may benefit greatly by creating a model from digitized motion picture film using automated image-interpretation techniques and then proceeding to combine computer-generated abstract elements with the elements derived from image-interpretation in a visually and aesthetically pleasing way.

Spatial two-dimensional (2-D) and three-dimensional (3-D) transforms such as translation, scaling, rotation, and other linear and non-linear transforms may also be applied in an orderly way. These transforms are often represented in conventional scene graphs that represent how objects have to obey certain constraints. Scene graphs are structures that arrange the logical and/or spatial representation of a graphical scene. They can be described as a collection of nodes in a graph (e.g., a Directed Acyclic Graph) or a tree structure. A node may have children, but often only one parent. The relationship between a parent and child may be referred to as an 'edge'. A constraint applied to a parent is applied to all of its children. Such constraints an a-cyclic, and operate in one direction from parent to child, but do not also operate from child to parent. For example, a 3D game may define a logical relationship between two entities or objects like a cart and a horse so that the cart is considered an extension of the horse. A scene graph with these two entities would have a 'horse' node with a 'cart' node attached to it as a child. As the horse moves, so does the cart. But, the cart does not move the horse (e.g., backwards down a hill).

Dual constraint systems are similar to a-cyclic constraint systems because a child cannot affect a parent, and a relationship between children requires a linking parent node. Sometimes referred to as a 'sibling' relationship, a dual constraint affects each object as a member of the same group. However, in order to create a dual constraint between the siblings, a parent "dual" node must be created, thereby creating a hierarchical relationship between siblings and a single parent in the same manner as a typical hierarchical scene graph. Moreover, dual constraint systems may break other parent-child relations held by each sibling object and respective parent objects upon the formation of the parent "dual" node.

As described above, a common approach for organizing a scene-graph in user-interface frameworks is to specify a hierarchical parent-child relationship between elements/objects. This approach has a shortcoming in that constraints are only propagated in one direction, parent to child. If a particular animation requires a child object to move the parent, either the hierarchy needs to be modified, or a special case animation code must be implemented.

A scene graph has additional limitations in relation to defining multiple relationships between an object and multiple other objects. A scene graph is a static diagram of hierarchical relationships, and multiple static scene graphs are required to define multiple relationships between a single object and multiple other objects. When dealing with multiple relationships between an object and multiple other objects, scene graphs further fail in blending the effects of the multiple constraints from the multiple other objects that are simultaneously operating on the single object.

Accordingly, what is needed are systems and methods for creating bidirectional constraints between two or more objects without breaking hierarchical relationships between each those two objects and respective parent objects. What is also needed are systems and methods for creating bidirectional constraints between two or more objects without creating a hierarchical relationship between those two or more objects and a new parent node. What is further needed are systems and methods for blending multiple constraints operating on a single object.

SUMMARY

This disclosure relates generally to methods and apparatus for animating images.

In one aspect, this disclosure relates to methods and systems for animating images based on a bidirectional constraint. The methods and systems may specify a bidirectional constraint between two objects, and render one or more images based on the bidirectional constraint. The bidirectional constraint may specify a change to a first object based on a change to a second object, and may also specify a change to the second object based on a second change to the first object.

The methods and systems may also create a dependency graph for a scene based on the bidirectional constraint upon the execution of a command relating to the second object, and the dependency graph may specify the change to the first object based on the change to the second object. The methods and systems may further render at least one image based on the dependency graph.

The methods and systems may also create another dependency graph for a scene based on the bidirectional constraint upon the execution of a command relating to the first object, and the other dependency graph may specify the change to the second object based on the change to the first object. The methods and systems may further render at least one image based on the other dependency graph.

The methods and systems may also constraint objects using bidirectional constraints without creating a hierarchical relationship associated with those objects.

The methods and systems may further blend the effects of various constraints on an object.

Additional aspects are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In various aspects, the techniques and apparatus described herein may be used for development, editing and/or generating output for computer graphics applications, including 3D computer graphics applications configured for execution on mobile devices. These mobile devices may be cellular phones, PDAs or other devices disposed for use in wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks as well as other communications networks.

Graphics editing is typically done in an authoring environment. The authoring environment may include computer hardware component such as servers, monitors, I/O devices, network connection devices, as well as other associated hardware for editing graphics. In addition, the authoring system may include one or more application programs configured to receive, convert, process, store, retrieve, transfer and/or export data and other content and information.

Some aspects of the invention relate to bidirectional constraint systems and methods that allow programmers and artists to freely define push/pull relationships and animations between objects without creating, destroying or requiring a hierarchical relationship between those objects. In accordance with one of these aspects, a bidirectional constraint between two objects leads to the creation of a directed/dependency graph at the moment that an animation or input value is executed. The resultant directed graph can describe either direction of the bidirectional constraint depending on the wishes of an editing artist or an equivalent person, computer, other editing entity. The direction of the directed graph may be defined in any number of ways, including definition by the flow of the animation, which can be changed by the editing entity. A key advantage to such a system and method is that editing entities can freely experiment with scenes with minimal or no concern about attaching and detaching objects to a hierarchy. Another key advantage to such a system and method is that the system and method removes the need for creating or modifying UI tree structures.

Another aspect includes an ability to freely control objects via various control sources (e.g. animations, input streams, live-data, etc. . . . ) without having to refactor any existing parent-child or ownership relationships.

Additional aspects include an ability to apply multiple constraints onto an object from any number of other objects. Application of these multiple constraints can involve a weighting of constraints, which results in constraints of higher weights having greater effect on the object than constraints of lower weights. Application of multiple constraints may alternatively involve blending the effects of the multiple constraints so a net effect on the object may not identically match any one effect of any one constraint. The net effect can, however, be informed by each individual effect of each constraint, and can result in a net effect that is similar to the individual effects of particular constraints. Application of multiple constraints may also involve animation of the net effect of the multiple constraints.

Other aspects of the invention include identification of bidirectional constraints between two or more objects, and operation of those bidirectional constraints on those two or more objects based on input from an editing entity. The operation of the bidirectional constraints on the objects may occur in addition to existing hierarchical relationships between the objects, or between each of the objects and other objects. Accordingly, the bidirectional constraints may be defined separate from hierarchical relationships, but are defined in such a way as to be compatible with those hierarchical relationships. For example, a prioritization scheme may be used to determine which of the bidirectional and hierarchical relationships control. Within multiple bidirectional relationships, a prioritization scheme may be used to determine whether one bidirectional relationship controls over another, conflicting bidirectional relationship. Alternatively, blending schemes can be implemented to weight conflicting relationships and then blend each individual effect of the conflicting relationships to create a net effect.

Figure 1:
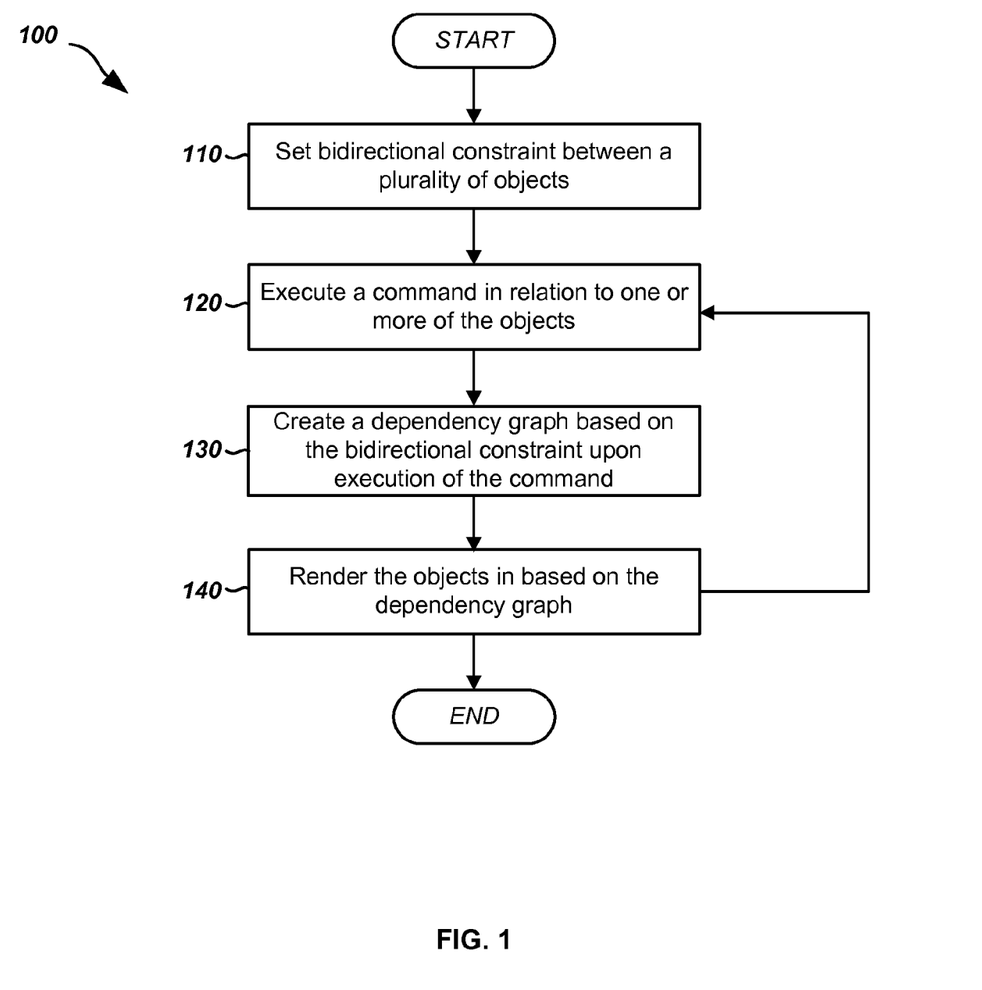
FIG. 1 illustrates an embodiment of a process for specifying a bidirectional constraint between two or more objects.

Attention is now directed to the figures. FIG. 1 illustrates an embodiment of a process 100 for manipulating objects in a non-hierarchical manner. At block 110, one or more bidirectional constraints between any number of objects from a plurality of objects are set. Each of the bidirectional constraints may be any type of constraint between any number of objects. In certain aspects, it is envisioned that the constraints be non-hierarchical. Such non-hierarchical constraints may allow a child object to constrain its respective parent object or the respective parent object of another child object. Indeed, the non-hierarchical constraints envisioned in certain aspects co-exist with other constraints (e.g., existing parent-child constraints). When the bidirectional constraints conflict with other constraints, whether bidirectional or non-bidirectional, a prioritization scheme may be employed to determine which constraints control over other constraints. Alternatively, conflicts between a bidirectional constraint and the other constraints may be resolved using a blending scheme. Under a blending scheme, the effects of each constraint on a particular object are individually determined, and those individual effects are combined—i.e., blended—to create a net blended effect that represents the total effect of the individual constraints on the particular object. Another scheme for resolving conflicts among constraints involves a weighting of individual constraints. Once a weight has been determined, a net blended effect may be determined how a particular object is affected by the combination of weighted constraints.

Figure 2A:
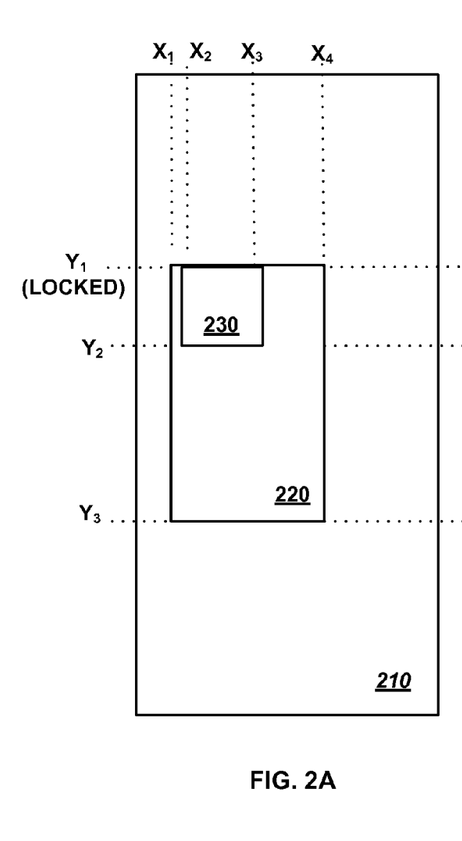
FIGS. 2A-C illustrate a locking constraint that is non-hierarchical and bidirectional.
Figure 2B:
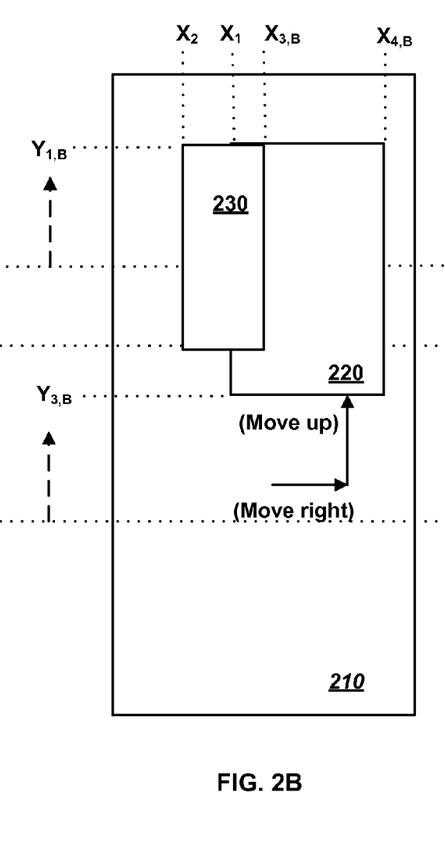
Figure 2C:
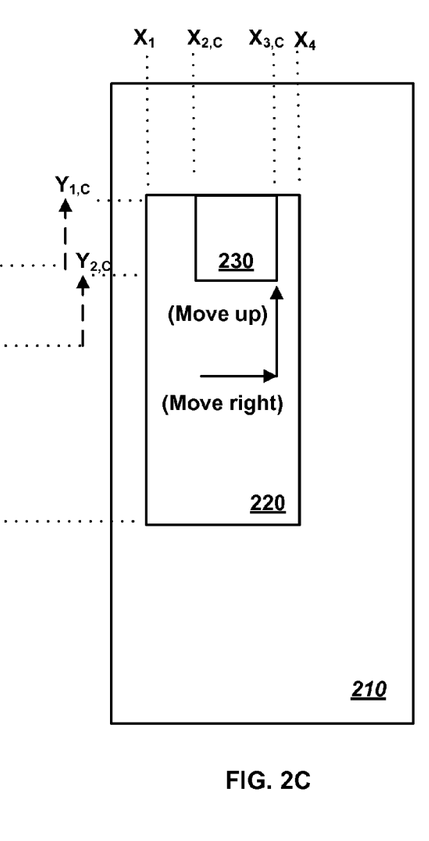

In accordance with some aspects, bidirectional constraints may include an type of constraints regarding translation of one object in relation to another object. For example, as shown in FIGS. 2A-C, a bidirectional constraint may specify a locking relationship between different portions of different objects. FIG. 2A depicts a display 210 with a first object 220 and a second object 230. As shown, the first object 220 and the second object 230 are locked along an axis $Y_1$.

FIG. 2B illustrates what can happen to the second object 230 when the first object 220 moves to the right and up from its position in the display 210 of FIG. 2A. As shown, the top portion of the second object 230 is locked to an alignment with the top portion of the first object 220. As the top portion of the first object 220 moves, so does the top portion of the second object. The side portions and the bottom portion of the second object 230, however, does not move with the first object 220 because those portions are not locked in aligned with respective portions of the first object 220. Consequently, the second object 230 changes shape in the upward vertical direction, but does not change shape in the horizontal direction or downward vertical direction. Also, as the first object 220 moves right, the second object 230 does not similarly move right because its sides are not locked to respective portions of the first object 220. If tracking of the second object 230 to the movements of the first object 220 were desired, without any shape change was desired, each border portion of the second object 230 could be locked to respective portions of the first object 220.

FIG. 2C illustrates what can happen to the first object 220 when the second object 230 moves to the right and up from its position in display 210 of FIG. 2A. As shown, the upward movement of the second object 230 elongates the shape of the first object 220 by the distance of the upward vertical movement. Also illustrated is the effect on the first object 220 of the rightward movement of the second object 230. As shown, the first object 220 does not track the horizontal movement of the second object 220, and its horizontal shape does not change. By way of example, coding of the bidirectional constraint illustrated in FIGS. 2A-C may be implemented as follows: Lock (Object 2 along $Y_1$ to Object 1 along $Y_1$), where $Y_1$ is identified in FIG. 2A.

Figure 3A:
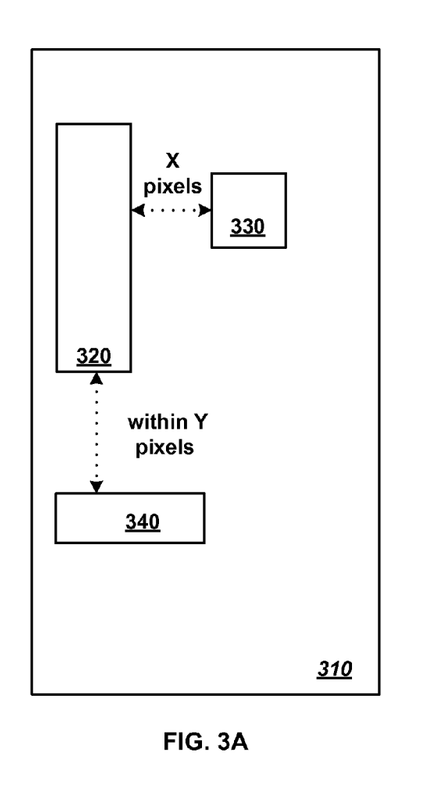
FIGS. 3A-C illustrate a proximity constraint that is non-hierarchical and bidirectional.
Figure 3B:
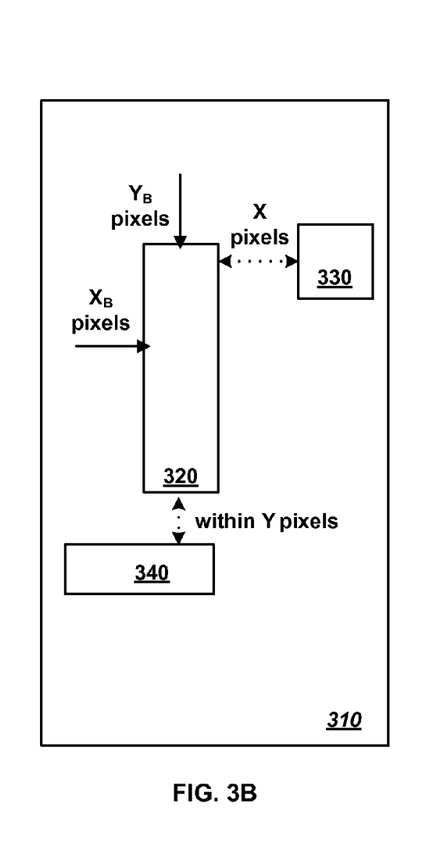
Figure 3C:
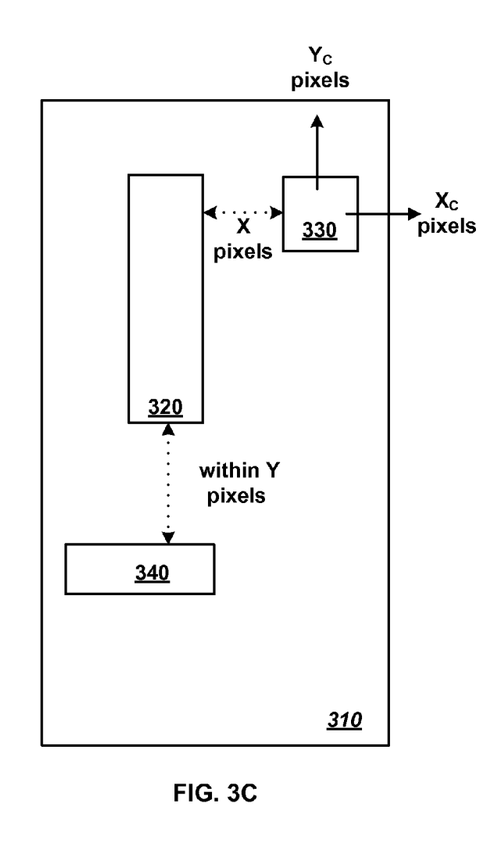

FIGS. 3A-C illustrate another bidirectional constraint that specifies movement of objects in relation to each other. FIG. 3A depicts a display 310 with a first object 320, a second object 330 and a third object 340. As shown, a bidirectional constraint between the first object 320 and the second object 330 specifies that they are always separated by X pixels, and a bidirectional constraint between the first object 320 and the third object 340 specifies that they are always separated by any number of pixels within a range of Y pixels.

FIG. 3B illustrates how the objects 330 and 340 move in relation to movement by the first object 320. As shown, the rightward horizontal movement by the first object 320 of $X_B$ pixels causes the second object 330 to move to the right the same number of $X_B$ pixels in order to maintain the X-pixel separation set forth by the bidirectional constraint shared by the first object 320 and the second object 330. One of skill the art will note, for the purposes of the illustration in FIG. 3B, that the horizontal movement by the first object 320 does not cause any horizontal movement by the third object 340 because no bidirectional constraint established an effect on the first object 320 or the third object 340 by horizontal movement from the third object 340 or the first object 320, respectively.

Also shown in FIG. 3B, the downward vertical movement by the first object 320 of $Y_B$ pixels does not cause the third object 340 to move down a same number of $Y_B$ pixels when $Y_B<Y$, as is illustrated. Had $Y_B>Y$, then the third object 340 would have moved downward by $Y_B-Y=y_b$ pixels. One of skill the art will note, for the purposes of the illustration in FIG. B, that the vertical movement by the first object 320 does not cause any vertical movement by the second object 330 because no bidirectional constraint established an effect on the first object 320 or the second object 330 by vertical movement from the second object 330 or the first object 320, respectively.

FIG. 3C illustrates how the objects 320 and 340 move in relation to movement by the second object 330. As shown, the rightward horizontal movement by the second object 330 of $X_C$ pixels causes the first object 320 to move to the right the same number of $X_C$ pixels in order to maintain the X-pixel separation set forth by the bidirectional constraint shared by the first object 320 and the second object 330. For the same reason discussed in relation to FIG. 3B, the horizontal movement by the second object 330 does not cause any horizontal movement by the third object 340 because no bidirectional constraint established an effect on the second object 330 or the third object 340 by horizontal movement from the third object 340 or the second object 330, respectively.

Also shown in FIG. 3C, the upward vertical movement by the second object 330 of $Y_C$ pixels does not cause the first object 320 to move up a same number of $Y_C$ pixels because no bidirectional constraint established an effect on the first object 320 or the second object 330 by vertical movement from the second object 330 or the first object 320, respectively. Because there was no upward vertical movement by the first object 320, no matching upward vertical movement was needed for the third object 340 in relation to the bidirectional constraint regarding the range of Y pixels between the first object 320 and the third object 340. By way of example, coding of the bidirectional constraint illustrated in FIGS. 3A-C may be implemented as follows: Keep (Object 1, Object 2, at X pixels apart); Keep (Object 1, Object 3, within Y pixels). An alternative manner of coding may be implemented as follows: movement(x axis, Object 1, time)=movement(x axis, Object 2, time), where the "x axis" specifies horizontal movement, and the movement occurs over a time period "time".

One of skill in the art will appreciate alternative bidirectional constraints to those described above. Such constraints may include any translation by an object in relation to a translation by another object.

As previously mentioned, certain aspects relate creation of bidirectional constraints among multiple objects. Each object may have other constraints associated with them (e.g., a hierarchical, parent-child relationship specified in a scene graph). One benefit of certain aspects of the present invention includes creation of non-hierarchical, bidirectional constraints in addition to existing constraints. The addition of a bidirectional constraint in relation to an object does not require any refactoring of another constraint associated with that object. For example, a parent object and a child object may, under most circumstances, have a hierarchical, parent-child relationship where changes to the parent object effect the child object, but changes to the child object do no effect the parent object. Under some circumstances during an editing process, an artist may determine that the child object needs to affect the parent object. Without breaking the parent-child relationship that is used under most circumstances, the artist can implement certain aspects of the invention to create a bidirectional relationship (or even a unidirectional relationship) between the child object and the parent object (or even a unidirectional relationship from the child object to the parent object). The artist can specify that, under certain circumstances, the bidirectional constraint operates in place of or in addition to the parent-child constraint. Accordingly, any bidirectional constraint is created separate from any hierarchical constraint, and any conflicts between the two constraints are resolved automatically based on predefined rules, user input, or other methods known by one of skill in the art.

It was previously mentioned that some aspects of the invention enable simultaneous handling of multiple constraints operating on one object. In order to resolve conflicts between constraints, blend factors, weights and/or prioritization schemes may be employed. A blend factor is a determination of a net effect on the object based on individual effects from some or all of the multiple constraints. The blend factor may be calculated using mathematical principles for resolving (e.g., combining, weighting, etc.) opposite, parallel, non-competing and other effects (e.g., forces, proximity changes, physical changes, state changes, etc.) on an object. The net effects of blend factors may be animated over time. For example, when multiple constraints operate on an object, a plurality of blend factors may be determined for sequential time units, and the object is then animated over time based on these sequential blend factors. The individual blend factors may alternate weighting on different constraints to create different animations of the object.

Attention is returned to FIG. 1, which illustrates, at block 120, the execution of a command in relation to one or more of the plurality of objects. The command may be any type of command that operates on at least one of the objects. For example, the command could move the object. Example movements of objects are illustrated in FIGS. 2A-C and 3A-C. Alternatively, the command may be to load the object and other objects for processing in another system. One of skill in the art will appreciate alternative commands.

Figure 4A:
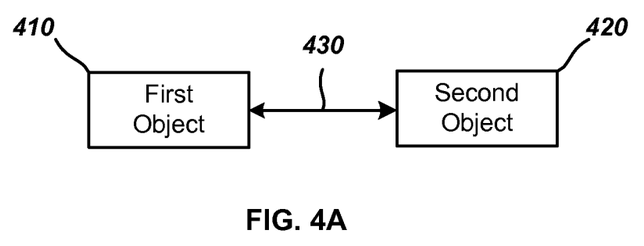
FIGS. 4A-C illustrate a bidirectional constraint and the creation of two unidirectional constraints based on the bidirectional constraint.
Figure 4B:
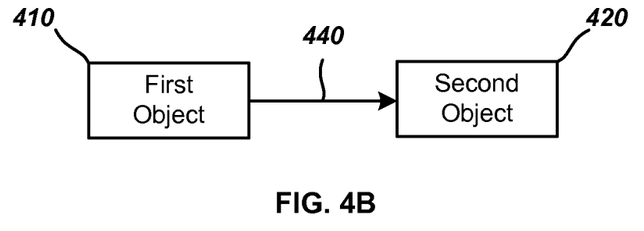
Figure 4C:
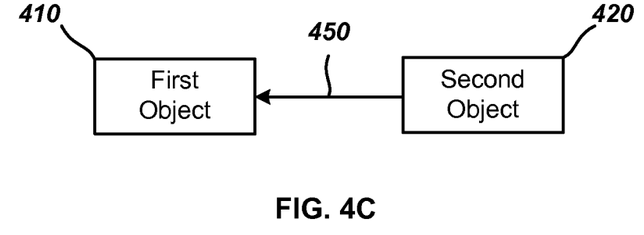

Next, at block 130, a graph establishing how the bidirectional constraint operates on the objects is created in response to the execution of the command. This graph, similar to a scene graph, describes how the various objects from the plurality of objects move and interact with each other, or otherwise transform given the command. When creating the graph, bidirectional constraints are identified. FIG. 4A illustrates one example of a bidirectional constraint 430 between a first object 410 and a second object 420. Given the command, the bidirectional constraint may be depicted in the graph as a unidirectional constraint. For example, FIG. 4B shows a unidirectional constraint 440 that is specified by the bidirectional constraint 430 after a command related to the first object 410 is executed (e.g., a command to move the first object 410). The constraint 440 specifies how the effect on the first object 410 from the command affects the second object 420. Similarly, FIG. 4C shows a unidirectional constraint 450 that is specified by the bidirectional constraint 430 after a command related to the second object 420 is executed (e.g., a command to move the second object 420). The constraint 450 specifies how the effect on the second object 420 from the command affects the first object 410.

As illustrated by FIGS. 4A-C, a dependency graph may specify one or more effects of a command on a first set of objects, and the secondary effect of that command on a second set of objects that are bidirectional constrained by the first set of objects. FIGS. 4A-C also illustrate that a dependency graph may specify one or more effects of a command on the second set of objects, and the secondary effect of that command on the first set of objects that are bidirectional constrained by the second set of objects.

Finally, at block 140, the objects from the plurality of objects are rendered based on the graph.

Figure 5:
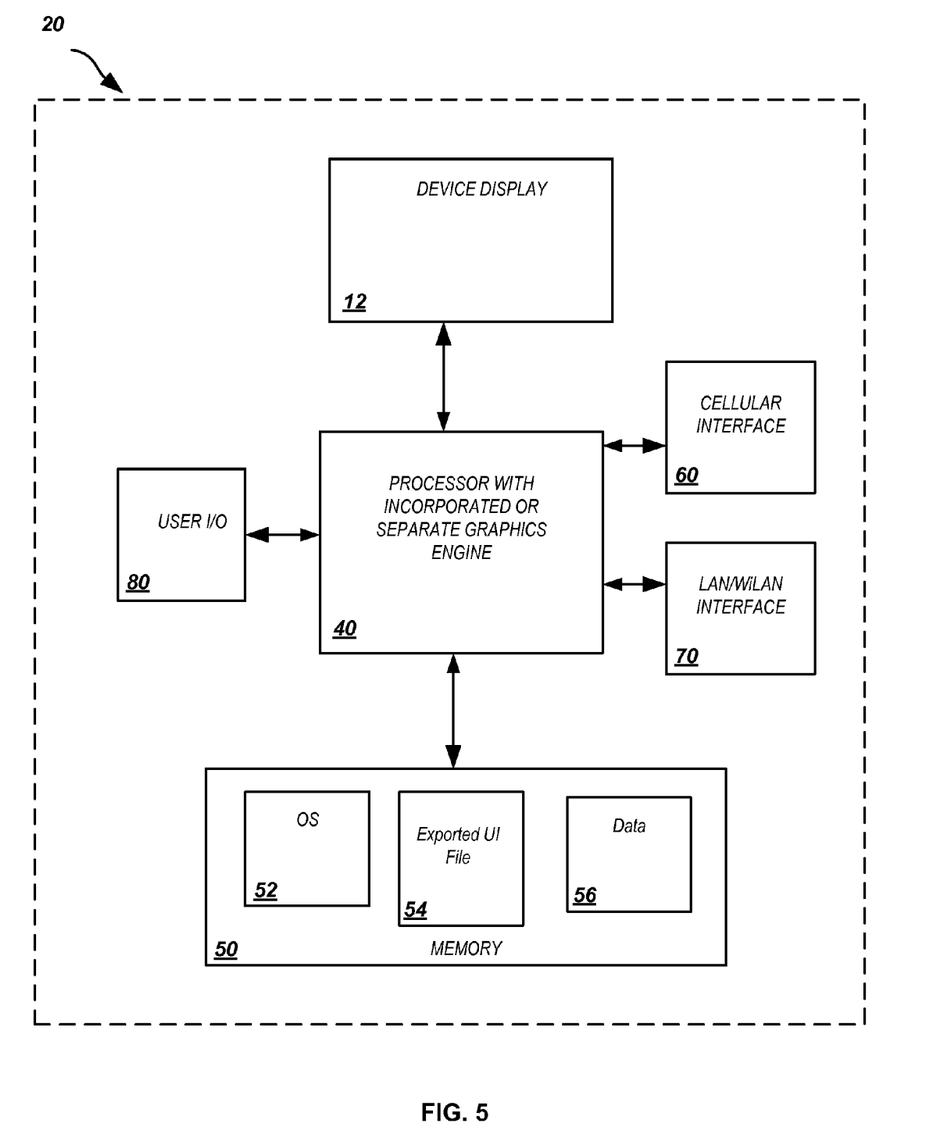
FIG. 5 illustrates a mobile device.

Attention is now drawn to FIG. 5, which illustrates details of a mobile device 20. In particular, mobile device 20 may include one or more processors 40. Processor 40 may be a graphics processor or may be a multi-purpose processor incorporating graphics processor functionality. Processor 40 is coupled to a memory space 50, which may comprise SRAM, DRAM, Flash and/or other physical memory devices. Memory space 50 may be configured to store an operating system (OS) 52, one or more application programs, such as a UI program 52, data 56 associated with the mobile device, applications running on processors in the device, user information, or other data or content. Mobile device 20 may further include one or more User I/O interfaces 80, such as keypads, touch screen inputs, mice, Bluetooth devices or other I/O devices. In addition, mobile device 20 may include a cellular or other over the air wireless carrier interface 60 as well as a network interface 70, that may be configured to communicate via a LAN or wireless LAN (WiLAN), such as a Wi-Fi network. Other interfaces, such as USB or other wired interfaces (not shown) may also be included.

Figure 6:
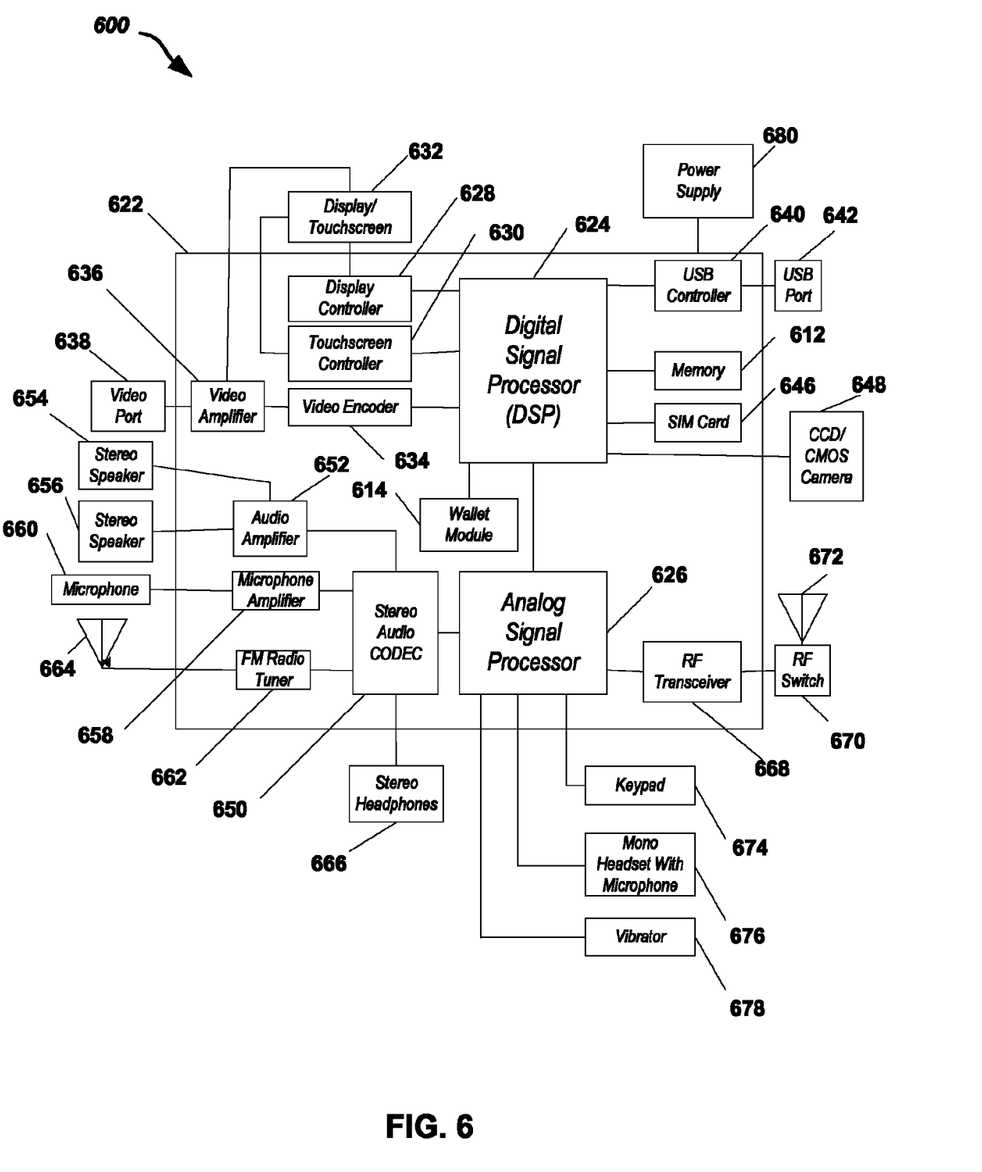
FIG. 6 illustrates an exemplary client device that comprises a mobile telephone.

Referring now to FIG. 6, this figure illustrates an exemplary, non-limiting aspect of a client device 600 comprising a wireless telephone which may correspond with FIG. 6. As shown, the client device 600 includes an on-chip system 622 that includes a digital signal processor 624 and an analog signal processor 626 that are coupled together. As illustrated in FIG. 6, a display controller 628 and a touchscreen controller 630 are coupled to the digital signal processor 624. A touchscreen display 632 external to the on-chip system 622 is coupled to the display controller 628 and the touchscreen controller 630.

FIG. 6 further indicates that a video encoder 634, e.g., a phase-alternating line ("PAL") encoder, a sequential couleur avec memoire ("SECAM") encoder, a national television system(s) committee ("NTSC") encoder or any other video encoder, is coupled to the digital signal processor 624. Further, a video amplifier 636 is coupled to the video encoder 634 and the touchscreen display 632. A video port 638 is coupled to the video amplifier 636. As depicted in FIG. 6, a universal serial bus ("USB") controller 640 is coupled to the digital signal processor 624. Also, a USB port 642 is coupled to the USB controller 640. A memory 612 and a subscriber identity module ("SIM") card 646 may also be coupled to the digital signal processor 624. Further, as shown in FIG. 6, a digital camera 648 may be coupled to the digital signal processor 624. In an exemplary aspect, the digital camera 648 is a charge-coupled device ("CCD") camera or a complementary metal-oxide semiconductor ("CMOS") camera.

As further illustrated in FIG. 6, a stereo audio CODEC 650 may be coupled to the analog signal processor 626. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation ("FM") radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further indicates that a radio frequency ("RF") transceiver 668 may be coupled to the analog signal processor 626. An RF switch 670 may be coupled to the RF transceiver 668 and an RF antenna 672. The RF transceiver 668 may communicate with mobile telephone networks as well as satellites to receive global positioning system ("GPS") signals. As shown in FIG. 6, a keypad 674 may be coupled to the analog signal processor 626. Also, a mono headset with a microphone 676 may be coupled to the analog signal processor 626. Further, a vibrator device 678 may be coupled to the analog signal processor 626. FIG. 6 also shows that a power supply 680 may be coupled to the on-chip system 622. In a particular aspect, the power supply 680 is a direct current ("DC") power supply that provides power to the various components of the client device 602 that require power. Further, in a particular aspect, the power supply is a rechargeable DC battery or a DC power supply that is derived from an alternating current ("AC") to DC transformer that is connected to an AC power source.

FIG. 6 also shows that the client device 600 may include a wallet module 66. The wallet module 66 may communicate with the client device management server 606 to update wallet information stored in the client device 602. As depicted in FIG. 6, the touchscreen display 632, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 are external to the on-chip system 622.

In a particular aspect, one or more of the method steps described herein may be stored in the memory 612 as computer program instructions. These instructions may be executed by the digital signal processor 624, the analog signal processor 626, or another processor, to perform the methods described herein. Further, the processors, 624, 626, the memory 612, the instructions stored therein, or a combination thereof may serve as a means for performing one or more of the method steps described herein.

Application programs, such as UI program, may be generated on an authoring/editing environment, and imported or loaded onto a mobile device from a cellular interface, network interface or other interfaces. Alternatively, the authoring/editing environment may operate on a mobile phone to generate application programs.

In the previous example embodiments, small numbers of objects and constraints are shown in the various examples for purposes of clarity. Nevertheless, in various implementations, large number of objects and constraints may be advantageously processed in an authoring/editing environment, or other similar or equivalent system, as described previously herein.

Some aspects of the invention have been discussed in relation to two dimensional objects. The teachings of such aspects apply also to three dimensional objects.

Aspects of the present invention may be used in relation to standards, multi-media platforms, file formats, video game engines and other equivalents. For example, content authored in relation to any or all of the various aspects of the present invention may relate to HTML 5, Flash, Scalable Vector Graphics (SVG), video game engines (e.g., Quake, Unreal, etc.) and any other equivalents.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps in the processes disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium.

In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It is intended that the following claims and their equivalents define the scope of the invention.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

It is intended that the following claims and their equivalents define the scope of the invention.

We claim:

1. A computer-implemented method for animating images, the method comprising:
    specifying, by a processor, a first bidirectional constraint between a first object and a second object;
    assigning weights to the first bidirectional constraint and to at least one other constraint between the first and second objects, wherein the assigned weights correspond to a relative degree of effect on the first and second objects, and wherein a prioritization scheme determines which of the first bidirectional constraint and the at least one other constraint controls;
    detecting execution of a command;
    determining whether the command relates to the first object or to the second object;
    creating a first graph for a first scene based on the first bidirectional constraint in response to determining that the command relates to the first object, wherein the first graph depicts the first bidirectional constraint as a unidirectional constraint specifying a resulting change to the second object based on a first change to the first object caused by the command;
    creating a second graph for a second scene based on the first bidirectional constraint in response to determining that the command relates to the second object, wherein the second graph depicts the first bidirectional constraint as a unidirectional constraint specifying a resulting change to the first object based on a first change to the second object caused by the command; and
    rendering one or more images based on the first bidirectional constraint.

2. The computer-implemented method of claim 1, wherein rendering one or more images based on the first bidirectional constraint comprises:
    rendering at least one of the one or more images based on the first graph in response to determining that the command relates to the first object.

3. The computer-implemented method of claim 2, wherein rendering one or more images based on the first bidirectional constraint comprises:
    rendering at least one of the one or more images based on the second graph in response to determining that the command relates to the second object.

4. The computer-implemented method of claim 3, wherein the first change to the second object caused by the command comprises a change in state of the second object, and wherein the first change to the first object caused by the command comprises a change in state of the first object.

5. The computer-implemented method of claim 1, wherein the first bidirectional constraint is capable of achieving a first change to a first state of the first object based on a first change to a first state of the second object and a second change to a second state of the second object based on a second change to a second state of the first object.

6. The computer-implemented method of claim 5, the method further comprising:
    rendering an image based on the first change to the first state of the first object and the first change to the first state of the second object, or based on the second change to the second state of the second object and the second change to the second state of the first object.

7. The computer-implemented method of claim 5, the method further comprising:
    rendering at least one of the one or more images, at a first instance in time, based on the first change to the first state of the first object and the first change to the first state of the second object; and
    rendering the at least one of the one or more images, at a second instance in time, based on the second change to the second state of the second object and the second change to the second state of the first object.

8. The computer-implemented method of claim 1, wherein the first bidirectional constraint is a non-hierarchical constraint, the method further comprising:
    creating the first bidirectional constraint without changing an existing constraint between either the first object or the second object and a third object.

9. The computer-implemented method of claim 1, the method further comprising:
    specifying a second bidirectional constraint between the first object and a third object;
    determining a blended effect on the first object from the first bidirectional constraint and the second bidirectional constraint; and
    rendering the one or more images based on the blended effect.

10. A computer system for animating images, the system comprising:
    means for specifying a first bidirectional constraint between a first object and a second object;
    means for assigning weights to the first bidirectional constraint and to at least one other constraint between the first and second objects, wherein the assigned weights correspond to a relative degree of effect on the first and second objects, and wherein a prioritization scheme determines which of the first bidirectional constraint and the at least one other constraint controls;
    means for detecting execution of a command;
    means for determining whether the command relates to the first object or to the second object;
    means for creating a first graph for a first scene based on the first bidirectional constraint in response to determining that the command relates to the first object, wherein the first graph depicts the first bidirectional constraint as a unidirectional constraint specifying a resulting change to the second object based on a first change to the first object caused by the command;

means for creating a second graph for a second scene based on the first bidirectional constraint in response to determining that the command relates to the second object, wherein the second graph depicts the first bidirectional constraint as a unidirectional constraint specifying a resulting change to the first object based on a first change to the second object caused by the command; and means for rendering one or more images based on the first bidirectional constraint.

11. The computer system of claim 10, wherein means for rendering one or more images comprises:

means for rendering at least one of the one or more images based on the first graph in response to determining that the command relates to the first object.

12. The computer system of claim 11, wherein means for rendering one or more images comprises:

means for rendering at least one of the one or more images based on the second graph in response to determining that the command relates to the second object.

13. The computer system of claim 12, wherein the first change to the second object caused by the command comprises a change in state of the second object, and wherein the first change to the first object caused by the command comprises a change in state of the first object.

14. The computer system of claim 10, wherein the first bidirectional constraint is capable of achieving a first change to a first state of the first object based on a first change to a first state of the second object and a second change to a second state of the second object based on a second change to a second state of the first object.

15. The computer system of claim 14, the system further comprising:

means for rendering an image based on the first change to the first state of the first object and the first change to the first state of the second object, or based on the second change to the second state of the second object and the second change to the second state of the first object.

16. The computer system of claim 14, the system further comprising:

means for rendering at least one of the one or more images, at a first instance in time, based on the first change to the first state of the first object and the first change to the first state of the second object; and means for rendering the at least one of the one or more images, at a second instance in time, based on the second change to the second state of the second object and the second change to the second state of the first object.

17. The computer system of claim 10, wherein the first bidirectional constraint is a non-hierarchical constraint, the system further comprising:

means for creating the first bidirectional constraint without changing an existing constraint between either the first object or the second object and a third object.

18. The computer system of claim 10, the system further comprising:

means for specifying a second bidirectional constraint between the first object and a third object;

means for determining a blended effect on the first object from the first bidirectional constraint and the second bidirectional constraint; and means for rendering the one or more images based on the blended effect.

19. A system for animating images, the system comprising:
a processor configured with processor-executable instructions to perform operations comprising:

specifying a first bidirectional constraint between a first object and a second object;

assigning weights to the first bidirectional constraint and to at least one other constraint between the first and second objects, wherein the assigned weights correspond to a relative degree of effect on the first and second objects, and wherein a prioritization scheme determines which of the first bidirectional constraint and the at least one other constraint controls;

detecting execution of a command;

determining whether the command relates to the first object or to the second object;

creating a first graph for a first scene based on the first bidirectional constraint in response to determining that the command relates to the first object, wherein the first graph depicts the first bidirectional constraint as a unidirectional constraint specifying a resulting change to the second object based on a first change to the first object caused by the command;

creating a second graph for a second scene based on the first bidirectional constraint in response to determining that the command relates to the second object, wherein the second graph depicts the first bidirectional constraint as a unidirectional constraint specifying a resulting change to the first object based on a first change to the second object caused by the command; and rendering one or more images based on the first bidirectional constraint.

20. The system of claim 19, wherein the processor is configured with processor-executable instructions to perform operations such that rendering at least one of the one or more images based on the first bidirectional constraint comprises:

rendering at least one of the one or more images based on the first graph in response to determining that the command relates to the second object.

21. The system of claim 20, wherein the processor is configured with processor-executable instructions to perform operations such that rendering one or more images based on the first bidirectional constraint comprises:

rendering at least one of the one or more images based on the second graph in response to determining that the command relates to the second object.

22. The system of claim 21, wherein the processor is configured with processor-executable instructions to perform operations such that the first change to the second object caused by the command comprises a change in state of the second object, and the first change to the first object caused by the command comprises a change in state of the first object.

23. The system of claim 19, wherein the processor is configured with processor-executable instructions to perform operations such that the first bidirectional constraint is capable of achieving a first change to a first state of the first object based on a first change to a first state of the second object and a second change to a second state of the second object based on a second change to a second state of the first object.

24. The system of claim 19, wherein the processor is configured with processor-executable instructions to perform operations further comprising:

rendering an image based on the first change to the first state of the first object and the first change to the first state of the second object, or based on the second change to the second state of the second object and the second change to the second state of the first object.

25. The system of claim 23, wherein the processor is configured with processor-executable instructions to perform operations further comprising:

rendering at least one of the one or more images, at a first instance in time, based on the first change to the first state of the first object and the first change to the first state of the second object; and rendering the at least one of the one or more images, at a second instance in time, based on the second change to the second state of the second object and the second change to the second state of the first object.

26. The system of claim 19, wherein the first bidirectional constraint is a non-hierarchical constraint, wherein the processor is configured with processor-executable instructions to perform operations further comprising:

creating the first bidirectional constraint without changing an existing constraint between either the first object or the second object and a third object.

27. The system of claim 19, wherein the processor is configured with processor-executable instructions to perform operations further comprising:

specifying a second bidirectional constraint between the first object and a third object; determine a blended effect on the first object from the first bidirectional constraint and the second bidirectional constraint; and rendering the one or more images based on the blended effect.

28. A non-transitory computer-readable medium having stored thereon processor-executable instructions configured to cause a computer processor to perform operations comprising:

specifying a first bidirectional constraint between a first object and a second object;

assigning weights to the first bidirectional constraint and to at least one other constraint between the first and second objects, wherein the assigned weights correspond to a relative degree of effect on the first and second objects, and wherein a prioritization scheme determines which of the first bidirectional constraint and the at least one other constraint controls;

detecting execution of a command;

determining whether the command relates to the first object or to the second object;

creating a first graph for a first scene based on the first bidirectional constraint in response to determining that the command relates to the first object, wherein the first graph depicts the first bidirectional constraint as a unidirectional constraint specifying a resulting change to the second object based on a first change to the first object caused by the command;

creating a second graph for a second scene based on the first bidirectional constraint in response to determining that the command relates to the second object, wherein the second graph depicts the first bidirectional constraint as a unidirectional constraint specifying a resulting change to the first object based on a first change to the second object caused by the command; and rendering one or more images based on the first bidirectional constraint.

29. The non-transitory computer-readable medium of claim 28, wherein the stored processor-executable instructions are configured to cause the computer processor to perform operations such that rendering one or more images based on the first bidirectional constraint comprises:

rendering at least one of the one or more images based on the first graph in response to determining that the command relates to the first object.

30. The non-transitory computer-readable medium of claim 29, wherein the stored processor-executable instructions are configured to cause the computer processor to perform operations such that rendering one or more images based on the first bidirectional constraint comprises:

rendering at least one of the one or more images based on the second graph in response to determining that the command relates to the second object.

31. The non-transitory computer-readable medium of claim 30, wherein the stored processor-executable instructions are configured to cause the computer processor to perform operations such that the first change to the second object caused by the command comprises a change in state of the second object, and the first change to the first object caused by the command comprises a change in state of the first object.

32. The non-transitory computer-readable medium of claim 28, wherein the stored processor-executable instructions are configured to cause the computer processor to perform operations such that the first bidirectional constraint is capable of achieving a first change to a first state of the first object based on a first change to a first state of the second object and a second change to a second state of the second object based on a second change to a second state of the first object.

33. The non-transitory computer-readable medium of claim 32, wherein the stored processor-executable instructions are configured to cause the computer processor to perform operations such that:

rendering an image based on the first change to the first state of the first object and the first change to the first state of the second object, or based on the second change to the second state of the second object and the second change to the second state of the first object.

34. The non-transitory computer-readable medium of claim 32, wherein the stored processor-executable instructions are configured to cause the computer processor to perform operations such that:

rendering at least one of the one or more images, at a first instance in time, based on the first change to the first state of the first object and the first change to the first state of the second object; and rendering the at least one of the one or more images, at a second instance in time, based on the second change to the second state of the second object and the second change to the second state of the first object.

35. The non-transitory computer-readable medium of claim 28, wherein the stored processor-executable instructions are configured to cause the computer processor to perform operations further comprising:

creating the first bidirectional constraint without changing an existing constraint between either the first object or the second object and a third object.

36. The non-transitory computer-readable medium of claim 28, wherein the stored processor-executable instructions are configured to cause the computer processor to perform operations further comprising:

specifying a second bidirectional constraint between the first object and a third object;

determining a blended effect on the first object from the first bidirectional constraint and the second bidirectional constraint; and rendering the one or more images based on the blended effect.

* * * * *